United States Patent
Böhm et al.

(10) Patent No.: US 7,660,035 B2
(45) Date of Patent: Feb. 9, 2010

(54) SCANNING MICROSCOPE

(75) Inventors: Ingo Böhm, Heidelberg (DE); Heinrich Ulrich, Heidelberg (DE); Werner Knebel, Kronau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 209 days.

(21) Appl. No.: 10/596,234

(22) PCT Filed: Oct. 13, 2004

(86) PCT No.: PCT/EP2004/052519

§ 371 (c)(1),
(2), (4) Date: Nov. 8, 2006

(87) PCT Pub. No.: WO2005/054924

PCT Pub. Date: Jun. 16, 2005

(65) Prior Publication Data

US 2007/0152556 A1    Jul. 5, 2007

(30) Foreign Application Priority Data

Dec. 5, 2003  (DE) ................. 103 56 826

(51) Int. Cl.
*G02B 21/06* (2006.01)
(52) U.S. Cl. ..................... 359/385; 359/368
(58) Field of Classification Search ......... 359/368–385, 359/389; 356/308, 317, 318, 326, 328
See application file for complete search history.

(56) References Cited

U.S. PATENT DOCUMENTS

| 6,094,300 A | 7/2000 | Kashima et al. |
| 6,525,812 B1* | 2/2003 | Hartmann et al. ............ 356/318 |
| 2002/0020800 A1* | 2/2002 | Knebel et al. ............ 250/201.3 |
| 2002/0027709 A1 | 3/2002 | Engelhardt et al. |
| 2002/0028044 A1* | 3/2002 | Birk et al. ...................... 385/43 |
| 2002/0043622 A1* | 4/2002 | Birk et al. .................... 250/306 |

FOREIGN PATENT DOCUMENTS

| DE | 19906757 | 12/1999 |
| DE | 100 39 530 A | 2/2002 |
| EP | 1 085 362 A | 3/2001 |
| EP | 1 178 345 A | 2/2002 |

OTHER PUBLICATIONS

International Search Report for International Application No. PCT/EP2004/052519, date of mailing Jan. 21, 2005.

* cited by examiner

*Primary Examiner*—Alessandro Amari
(74) *Attorney, Agent, or Firm*—Darby & Darby

(57) ABSTRACT

A scanning microscope includes at least one light source, an acousto-optical element, a beam deflection device and a beam guiding device. The at least one light source generates an illuminating light beam. The acousto-optical element spatially splits a sub-light beam from the illuminating light beam and adjusts an optical power of the illuminating light beam. The beam deflection device scans the illuminating light beam over or through a sample. The beam guiding device directs the sub-light beam onto the sample.

14 Claims, 5 Drawing Sheets

SCANNING MICROSCOPE

CROSS REFERENCE TO PRIOR APPLICATION

The above-referenced application is the U.S. National Phase of International Patent Application PCT/EP2004/052519, filed Oct. 13, 2004, which claims priority from German Application No. 103 56 826.3, filed Dec. 5, 2003, which is incorporated by reference herein. The International application was published in German on Jun. 16, 2005 as WO 2005/054924 A1.

The present invention relates to a scanning microscope including at least one light source generating an illuminating light beam, an acousto-optical element for adjusting the optical power of the illuminating light beam, and further including a beam deflection device for scanning the illuminating light beam over or through a sample.

BACKGROUND

In scanning microscopy, a sample is illuminated with a light beam in order to observe the reflected or fluorescent light emitted from the sample. The focus of an illuminating light beam is moved in a sample plane using a controllable beam deflection device, generally by tilting two mirrors; the deflection axes usually being perpendicular to one another so that one mirror deflects in the X direction and the other in the Y direction. Tilting of the mirrors is brought about, for example, by galvanometer positioning elements. The power of the light coming from the sample is measured as a function of the position of the scanning beam. The positioning elements are usually equipped with sensors to determine the current mirror position.

In confocal scanning microscopy specifically, a sample is scanned in three dimensions with the focus of a light beam. A confocal scanning microscope generally includes a light source, a focusing optical system used to focus the light of the source onto a pinhole (called the "excitation pinhole"), a beam splitter, a beam deflection device for beam control, a microscope optical system, a detection pinhole, and the detectors for detecting the detection or fluorescent light. The illuminating light is coupled in, for example, via a beam splitter. The fluorescent or reflected light coming from the sample travels back via the beam deflection device to the beam splitter, passes through it, and is then focused onto the detection pinhole behind which the detectors are located. Detection light that does not derive directly from the focus region takes a different light path and does not pass through the detection pinhole, so that point information is obtained which leads to a three-dimensional image by sequential scanning of the sample.

In order to couple the excitation light of at least one light source into the microscope and to separate out, from the light coming via the detection beam path from the sample, the excitation light scattered and reflected at the sample, or the excitation wavelength, it is also possible to provide, instead of the beam splitter, an optical device embodied as an acousto-optical element, for example as known from German Unexamined Application DE 199 06 757 A1.

A three-dimensional image is usually achieved by acquiring image data in layers; the path of the scanning light beam on or in the sample ideally describing a meander (scanning one line in the x-direction at a constant y-position, then stopping the x-scan and slewing by y-displacement to the next line to be scanned, then scanning that line in the negative x-direction at a constant y-position, etc.). To allow the acquisition of image data in layers, the sample stage or the objective lens is shifted after a layer has been scanned, and the next layer to be scanned is thus brought into the focal plane of the objective lens.

In some microscopic applications, it is necessary to be able to manipulate the sample during scanning or between two scanning operations. Such manipulation may include, for example, the release of bound dyes, a bleaching operation, a cutting operation, or the use of optical tweezers.

U.S. Pat. No. 6,094,300 describes a laser scanning microscope including a first light source whose light is scanned over a sample by a first scanner, and further including a second light source whose light can be scanned over the sample as manipulation light by a second scanner.

German Patent Application DE 100 39 520 A1 also discloses a scanning microscope including two beam deflection devices, which independently scan light from different light sources over or through a sample.

SUMMARY OF THE INVENTION

It is an object of the present invention to provide a scanning microscope which allows both observation and manipulation of a sample while reducing the minimum required number of light sources, and which also allows rapid modulation of the optical power of the manipulation light and illuminating light.

The present invention provides a scanning microscope in which an acousto-optical element spatially splits a sub-light beam from the illuminating light beam, and that beam guiding means are provided which direct the sub-light beam onto the sample, preferably to manipulate the same.

The scanning microscope according to the present invention has the advantage of allowing the sample to be independently observed and manipulated simultaneously or sequentially by the illuminating light beam and the sub-light beam. In this process, it is possible to accurately and quickly adjust the optical power in the illuminating light beam and in the sub-light beam.

Advantageously, the light that an acousto-optical element controlling the optical power would direct into a beam trap anyway can be used as the sub-light beam.

In a preferred embodiment, the acousto-optical element includes an AOTF (acousto-optical tunable filter).

Preferably, a further beam deflection device is provided for scanning the sub-light beam over or through a sample. As is common in scanning microscopy, the further beam deflection device can include galvanometer mirrors or acousto-optically deflecting scanners or, for example, micromirrors.

The scanning microscope includes an objective lens which focuses the illuminating light beam onto the sample. Preferably, the objective lens also focuses the sub-light beam onto the sample. To this end, after passing the beam deflection device and the further beam deflection device, respectively, the optical paths of the illuminating light beam and sub-light beam are recombined at a point before the objective lens.

In another advantageous embodiment of the scanning microscope, a further objective lens is provided which focuses the sub-light beam onto the sample. In this variant, the sample can, for example, be observed through the objective lens from above and, at the same time, be manipulated from below through a further objective lens or through the condenser.

The beam guiding means directing the sub-light beam onto the sample preferably include an optical waveguide.

In a particular variant, the component that the acousto-optical element separates from the illuminating light beam as a sub-light beam is a component having a specific polarization property. For example, the illuminating light beam emanating from the light source can be linearly polarized, the acousto-optical element splitting off, for example, the sagittally polarized component as a sub-light beam while passing the tangentially polarized component as an illuminating light beam. The ratio of the optical power of the sub-light beam to the optical power of the illuminating light beam that has passed through the acousto-optical element can be adjusted by rotating the polarization plane of the illuminating light beam emanating from the light source using a polarization-controlling means, which may take the form of a λ/2 plate.

Preferably, compensation means are provided which compensate for spatial spectral dispersion of the sub-light beam and/or illuminating light beam caused by the acousto-optical element. These compensation means can take the form, for example, of a prism and/or a grating and/or a further acousto-optical element. Compensation for spatial spectral dispersion is important, especially if the sub-light beam and/or the illuminating light beam is/are to be coupled into an optical fiber for further transport.

In a preferred embodiment variant, the acousto-optical element directs detection light emanating from the sample to a detector or a detector system, either indirectly or directly. In this case, the acousto-optical element additionally functions as an acousto-optical beam splitter, as is disclosed, for example, in DE 199 06 757 A1.

In a preferred variant, the scanning microscope is a confocal scanning microscope.

BRIEF DESCRIPTION OF THE DRAWINGS

Embodiments of the invention are schematically illustrated in the drawings and will be described below with reference to the Figures, in which like reference numerals indicate like or functionally similar elements, and in which.

DETAILED DESCRIPTION

Figure 1:
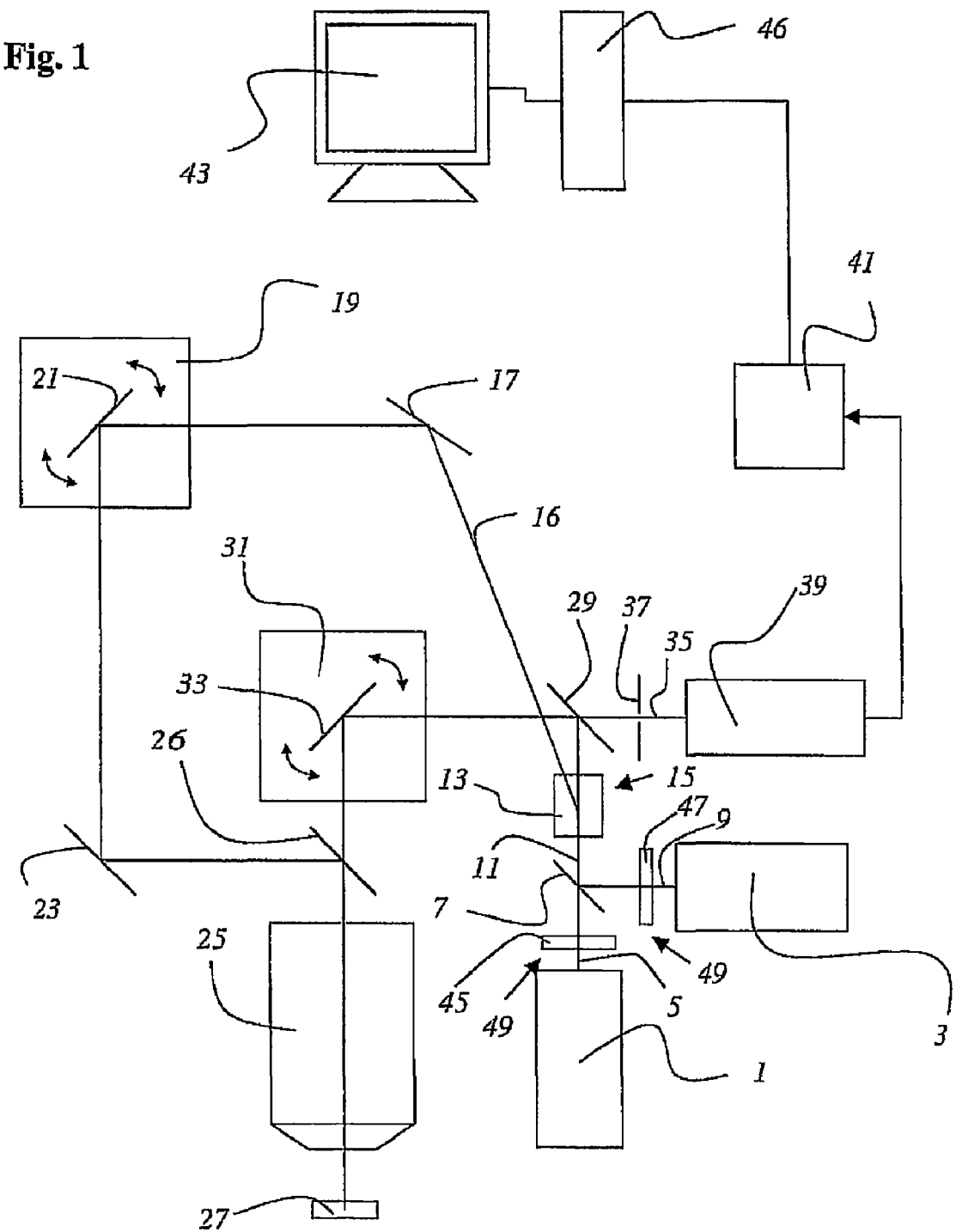
FIG. 1 shows a scanning microscope according to the present invention.

FIG. 1 shows a scanning microscope according to the present invention, including a first light source 1 in the form of an argon-krypton laser and second light source 3 in the form of a helium-neon laser. First laser light 5 produced by light source 1 and second laser light 9 emitted by second light source 3 are combined by a dichroic beam splitter 7 into an illuminating light beam 11. An acousto-optical element 15 in the form of an AOTF 13 is disposed in the optical path of illuminating light beam 11 for adjusting the optical power of the illuminating light beam. The acousto-optical element splits a sub-light beam 16 from illuminating light beam 11, said sub-light beam being directed, via deflecting mirror 17, to a further beam deflection device 19 containing a further gimbal-mounted scanning mirror 21. Sub-light beam 16 passes from further beam deflection device 19 via a further deflecting mirror 23 to a dichroic beam deflector 26, which directs sub-light beam 16 through objective lens 25 onto sample 27 to manipulate the same. The remaining portion of the illuminating light beam is directed by a main beam splitter 29 to a beam deflection device 31 containing a gimbal-mounted scanning mirror 33. Beam deflection device 31 directs illuminating light beam 11 through a scanning lens system and a tube lens system and through objective lens 25, and scans said illuminating light beam over sample 27. Detection light 35 emanating from the sample travels back to beam deflection device 31 along the same light path, namely through objective lens 25, through the scanning lens system and the tube lens system, and, after passing through main beam splitter 29 and detection pinhole 37, strikes detection device 39, which produces electrical signals proportional to the power of the detection light. The electrical detection signals produced are transmitted to a processing unit 41, which displays an image of the sample on monitor 43 of a PC 46. Beam deflection device 31 and further beam deflection device 19 are controlled by processing unit 41 according to the input from the user. A λ/2 plate 45 is provided in the optical path of the first laser, said λ/2 plate allowing adjustment of the polarization direction of light 5 emitted by the first laser. Similarly, a second λ/2 plate 47 is provided, as a polarization-controlling means 49, in the optical path of second laser 3 and used to adjust the polarization direction of light 9 emitted by the second laser. By rotating λ/2 plates 45, 47, the ratio of the optical power of sub-light beam 16 to the optical power of illuminating light beam 11 can be adjusted with respect to the respective light wavelength components emitted by the lasers.

Figure 2:
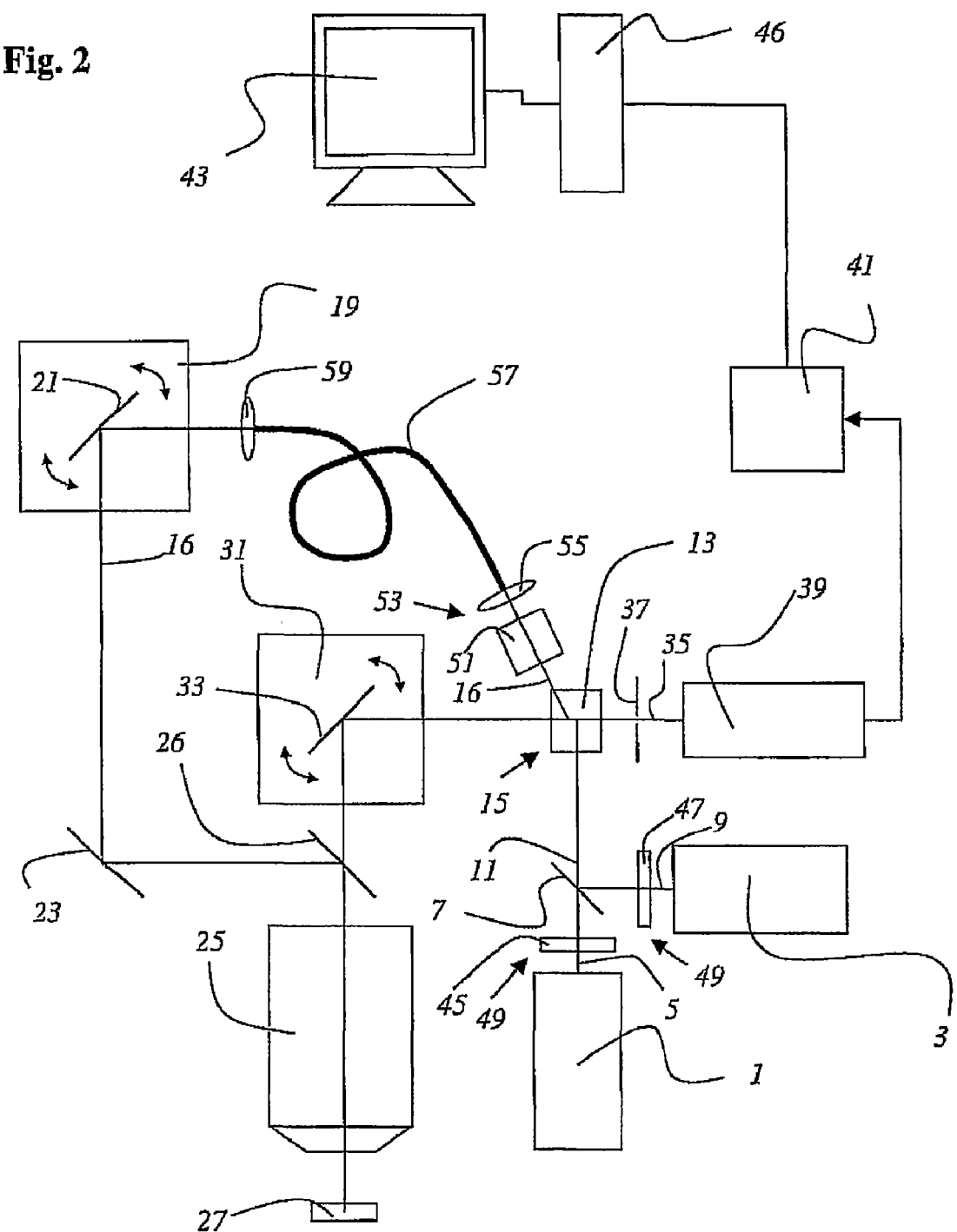
FIG. 2 shows a further scanning microscope according to the present invention.

FIG. 2 shows a further scanning microscope according to the present invention, in which acousto-optical element 15 takes the form of an AOTF 13. In this scanning microscope, AOTF 13 has the additional function of supplying detection light 35 emanating from the sample to detector device 39. At the same time, AOTF 13 splits off a sub-light beam 16 which, after passing through a compensation means 53 in the form of a further AOTF 51, is coupled into an optical fiber 57 with the aid of an optical system 55. Sub-light beam 16, after being coupled out of optical fiber 57 with the aid of further optical system 59, passes to further beam deflection device 19 and is scanned over or through the sample, analogously to the scanning microscope shown in FIG. 1.

Figure 3:
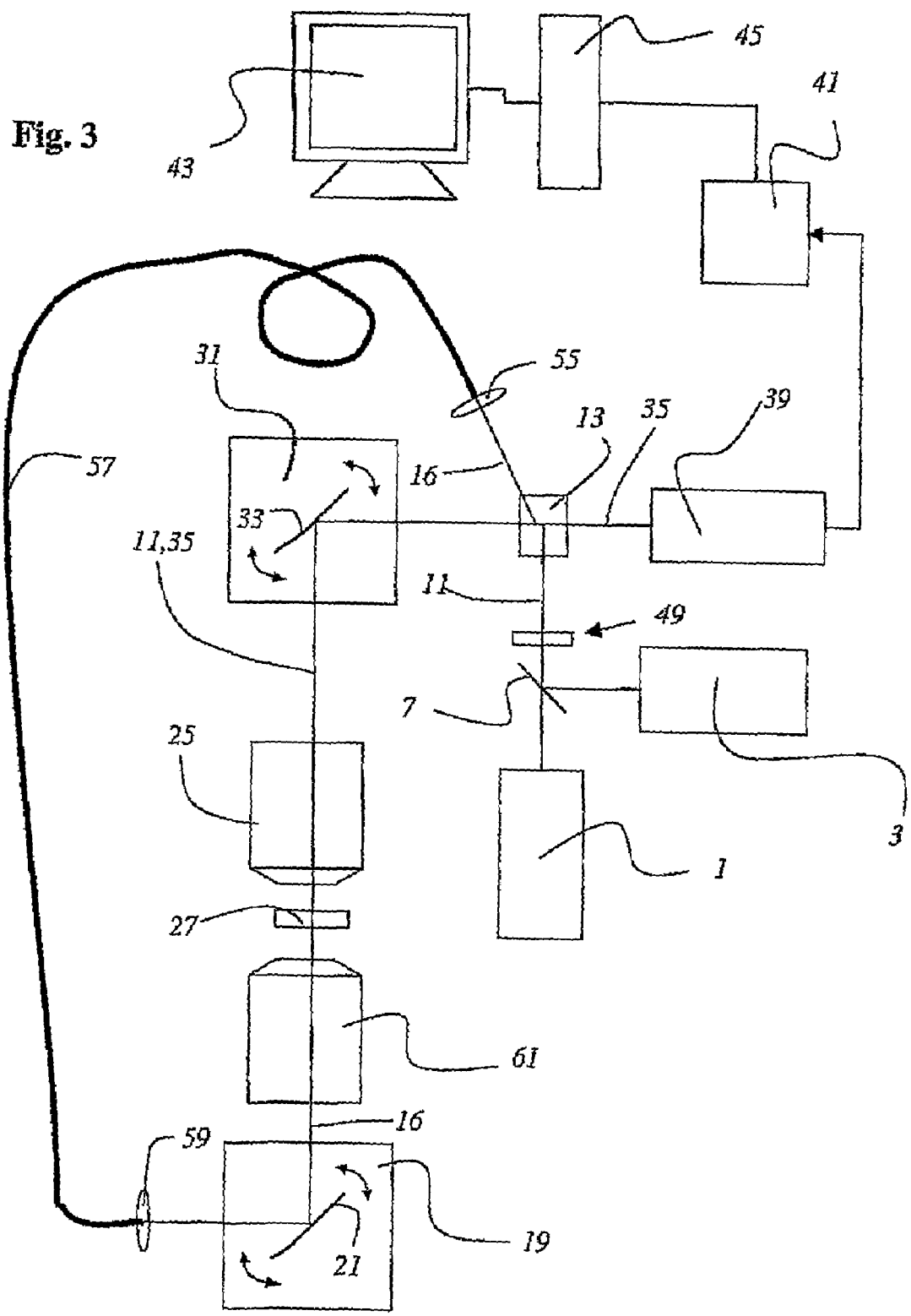
FIG. 3 shows another scanning microscope according to the present invention.

FIG. 3 show another variant of a scanning microscope according to the present invention, in which a further objective lens 61 is provided to direct sub-light beam 16, which is controlled by further beam deflection device 19, onto sample 27 from below.

Figure 4:
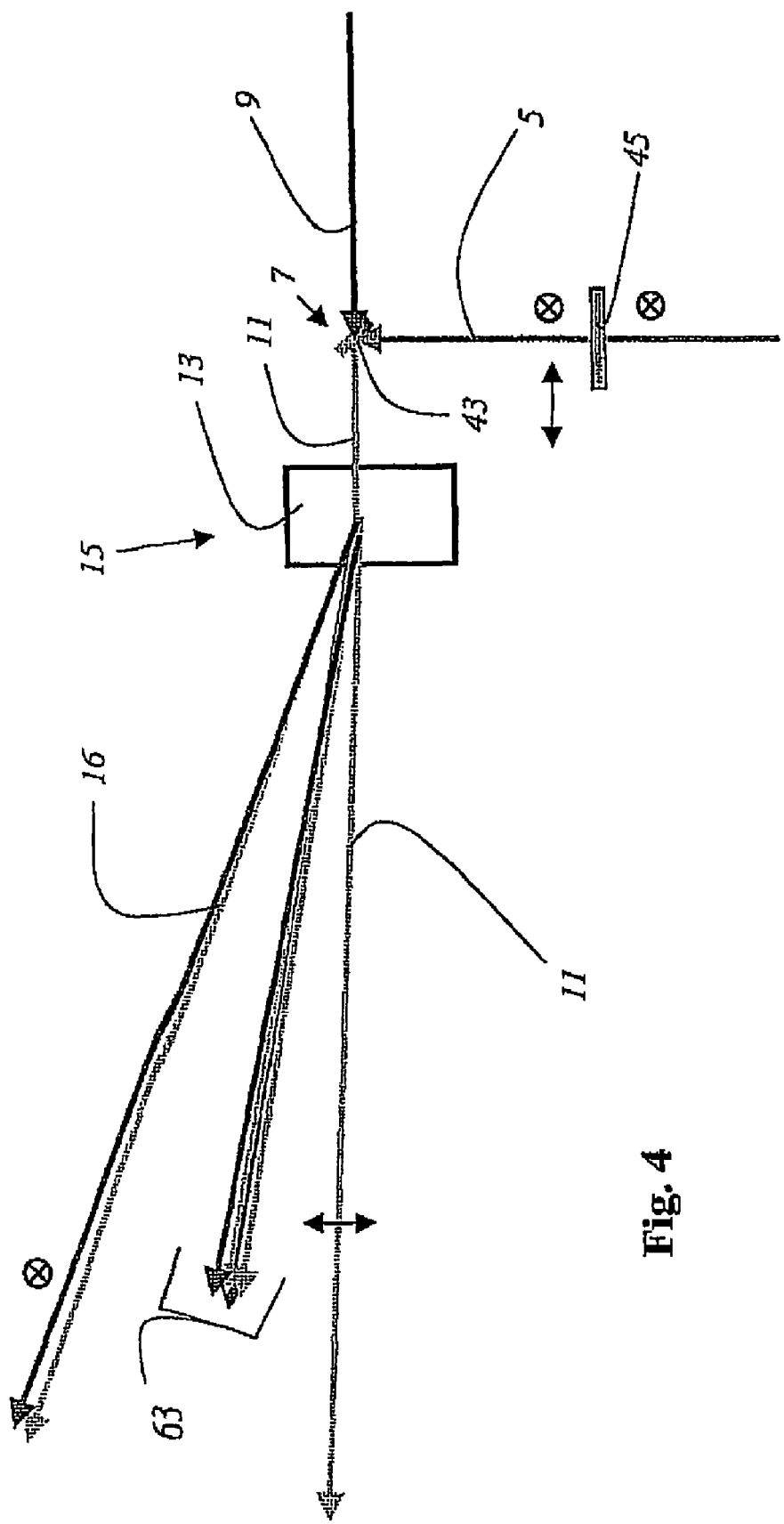
FIG. 4 is a detail view of the beam path in the region of an acousto-optical element.

FIG. 4 is a detail view of the mode of operation of acousto-optical element 15, which takes the form of an AOTF 13. Light 5, 9 coming from the first and second light sources is combined by a beam combiner 7 into an illuminating light beam 11, and is diffracted and split by the acoustic wave passing through AOTF 13. AOTF 13 splits a sub-light beam 16 from illuminating light beam 11, said sub-light beam being directed, via beam guiding means, onto sample 27 as manipulation light. Here, the manipulation light is in the first order of diffraction for sagittally polarized light. The portion of illuminating light beam 11 that is directed to beam deflection device 31 is in the first order of diffraction for tangentially polarized light. The remaining light, i.e., light that is currently not needed, is mainly in the zero diffraction order and is directed into a beam trap 63. In principle, however, it would also be possible to direct this light onto the sample to manipulate the same. Using a λ/2 plate 45 in the optical path of light 5 allows adjustment of the linear polarization of light 5, and thus of the ratio of the optical power of sub-light beam 16 to the optical power of illuminating light beam 11 diffracted into the first order.

Figure 5:
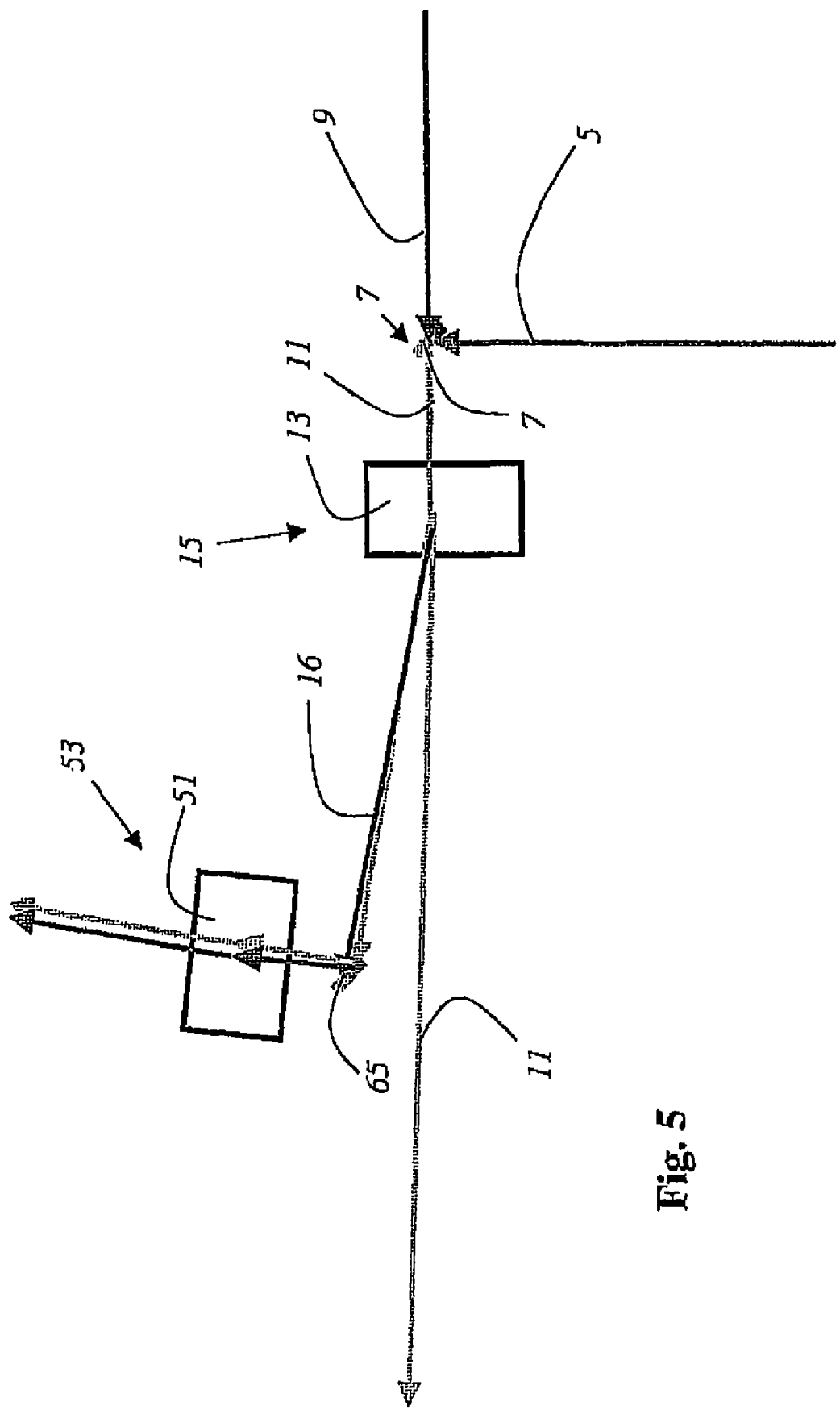
FIG. 5 is another detail view of the beam path in the region of an acousto-optical element.

FIG. 5 is another detail view, where a sub-light beam 16 is split off by AOTF 13 and directed to a compensation means 53 by a deflecting mirror 65. Compensation means is formed by a further AOTF 51, which is arranged such that it reverses the spatial spectral dispersion caused by AOTF 13, so that the different spectral components of sub-light beam 16 run substantially coaxially. In this exemplary embodiment, sub-light beam 16 is in the zero diffraction order, while illuminating light beam 11 to be supplied to the beam deflection device is in the first diffraction order.

The present invention has been explained with reference to a specific embodiment. However, it is apparent that changes and modifications can be made without exceeding the scope of the following claims.

LIST OF REFERENCE NUMERALS 1 light source
3 light source
5 first laser light
7 beam splitter
9 second laser light
11 illuminating light beam
13 AOTF
15 acousto-optical element
16 sub-light beam
17 deflecting mirror
19 further beam deflection device
21 further scanning mirror
23 further deflecting mirror
25 objective lens
26 beam deflector
27 sample
29 main beam splitter
31 beam deflection device
33 scanning mirror
35 detection light
37 detection pinhole
39 detection device
41 processing unit
43 monitor
45 λ/2 plate
46 PC
47 λ/2 plate
49 polarization-controlling means
51 further AOTF
53 compensation means
55 optical system
57 optical fiber
59 further optical system
61 further objective lens
63 beam trap
65 deflecting mirror

What is claimed is:

1. A scanning microscope comprising:
at least one light source configured to generate an illuminating light beam;
an acousto-optical element configured to spatially split a sub-light beam from the illuminating light beam so as to provide an adjusted illuminating light beam for scanning a sample and the sub-light beam for manipulating the sample;
a beam deflection device configured to scan the adjusted illuminating light beam over or through the sample; and
a beam guiding device configured to direct the sub-light beam split by the acousto-optical element onto the sample so as to manipulate the sample.

2. The scanning microscope as recited in claim 1 wherein the acousto-optical element includes an acousto-optical tunable filter.

3. The scanning microscope as recited in claim 1 further comprising a further beam deflection device configured to scan the sub-light beam over or through the sample.

4. The scanning microscope as recited in claim 1 further comprising an objective lens configured to focus the illuminating light beam onto the sample.

5. The scanning microscope as recited in claim 4 wherein the objective lens is configured to focus the sub-light beam onto the sample.

6. The scanning microscope as recited in claim 4 further comprising a further objective lens configured to focus the sub-light beam onto the sample.

7. The scanning microscope as recited in claim 1 wherein the beam guiding device includes an optical waveguide.

8. The scanning microscope as recited in claim 1 wherein the sub-light beam has a specific polarization property.

9. The scanning microscope as recited in claim 8 further comprising a polarization control device disposed between the at least one light source and the acousto-optical element.

10. The scanning microscope as recited in claim 9 wherein the polarization control device includes a λ/2 plate.

11. The scanning microscope as recited in claim 1 further comprising a dispersion compensation device configured to compensate for spatial spectral dispersion, caused by the acousto-optical element, of at least one of the sub-light beam and the illuminating light beam.

12. The scanning microscope as recited in claim 11 wherein the dispersion compensation device includes at least one of a prism, a grating and a further acousto-optical element.

13. The scanning microscope as recited in claim 1 wherein the acousto-optical element is configured to direct, to a detector, detection light emanating from the sample.

14. The scanning microscope as recited in claim 1 further comprising an excitation pinhole configured to support confocal scanning microscopy.

* * * * *